(12) United States Patent
Gao

(10) Patent No.: US 7,896,560 B2
(45) Date of Patent: Mar. 1, 2011

(54) LENS COVER AND PORTABLE ELECTRONIC DEVICE USING THE SAME

(75) Inventor: Rong-Qiang Gao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 19 days.

(21) Appl. No.: 12/544,799

(22) Filed: Aug. 20, 2009

(65) Prior Publication Data

US 2010/0135650 A1   Jun. 3, 2010

(30) Foreign Application Priority Data

Nov. 28, 2008   (CN) .......................... 2008 1 0305856

(51) Int. Cl.
*G03B 17/00*   (2006.01)

(52) U.S. Cl. ...................................................... 396/448
(58) Field of Classification Search ................... 396/448
See application file for complete search history.

(56) References Cited

U.S. PATENT DOCUMENTS

| | | | |
|---|---|---|---|
| 7,811,012 B2 * | 10/2010 | Ho et al. ...................... | 396/439 |
| 2007/0025726 A1 * | 2/2007 | Kim ............................. | 396/448 |
| 2009/0086088 A1 * | 4/2009 | Lee .............................. | 348/374 |

* cited by examiner

*Primary Examiner* — W. B. Perkey
*Assistant Examiner* — Linda B Smith
(74) *Attorney, Agent, or Firm* — Steven M. Reiss

(57) ABSTRACT

A lens cover is slidably mounted to a lens, the lens cover comprises a main body, two guiding plated. The two guiding plates respectively protrude outwardly from two opposite side of the main body. Each guiding plate has a plurality of contacting portions. Each guiding plate has a plurality of contacting portions protruding from an surface thereof facing the lens, and each contacting portion includes a rolling ball mounted thereon.

20 Claims, 4 Drawing Sheets

LENS COVER AND PORTABLE ELECTRONIC DEVICE USING THE SAME

This application is related to co-pending U.S. Patent Applications, entitled "LENS COVER AND PORTABLE ELECTRONIC DEVICE USING THE SAME", by Bo Zhang et al. Such applications have the same assignee as the present application and have been concurrently filed herewith. The above-identified applications are incorporated herein by reference.

BACKGROUND

1. Technical Field

The exemplary disclosure generally relates to lens covers, and particularly to lens covers used in portable electronic devices.

2. Description of Related Art

It is now common to find digital camera modules incorporated into many types of portable electronic devices. Such portable electronic devices tend to incorporate digital camera modules of increasing quality and functionality as various manufacturers compete with each other to provide improved funtionalities while maintaining portability of the device.

Typically, as the quality of the camera assembly increases, the requirement for larger size and higher quality lenses increases. Larger lenses allow more light into the camera assembly, thereby improving image quality. To maintain the quality of the images, some kind of lens cover is slidably mounted on the lens, in order to protect the lens from scratches and containments. However, the friction factor between the lens and the lens cover is so large that the lens cover cannot slide smoothly relative to the lens.

Therefore, there is room for improvement within the art.

BRIEF DESCRIPTION OF THE DRAWINGS

Many aspects of the exemplary embodiments can be better understood with references to the following drawings. The components in the drawings are not necessarily drawn to scale, the emphasis instead being placed upon clearly illustrating the principles of the exemplary lens cover and portable electronic device using lens cover. Moreover, in the drawings like reference numerals designate corresponding parts throughout the several views. Wherever possible, the same reference numbers are used throughout the drawings to refer to the same or like elements of an exemplary embodiment.

DETAILED DESCRIPTION

Figure 1:
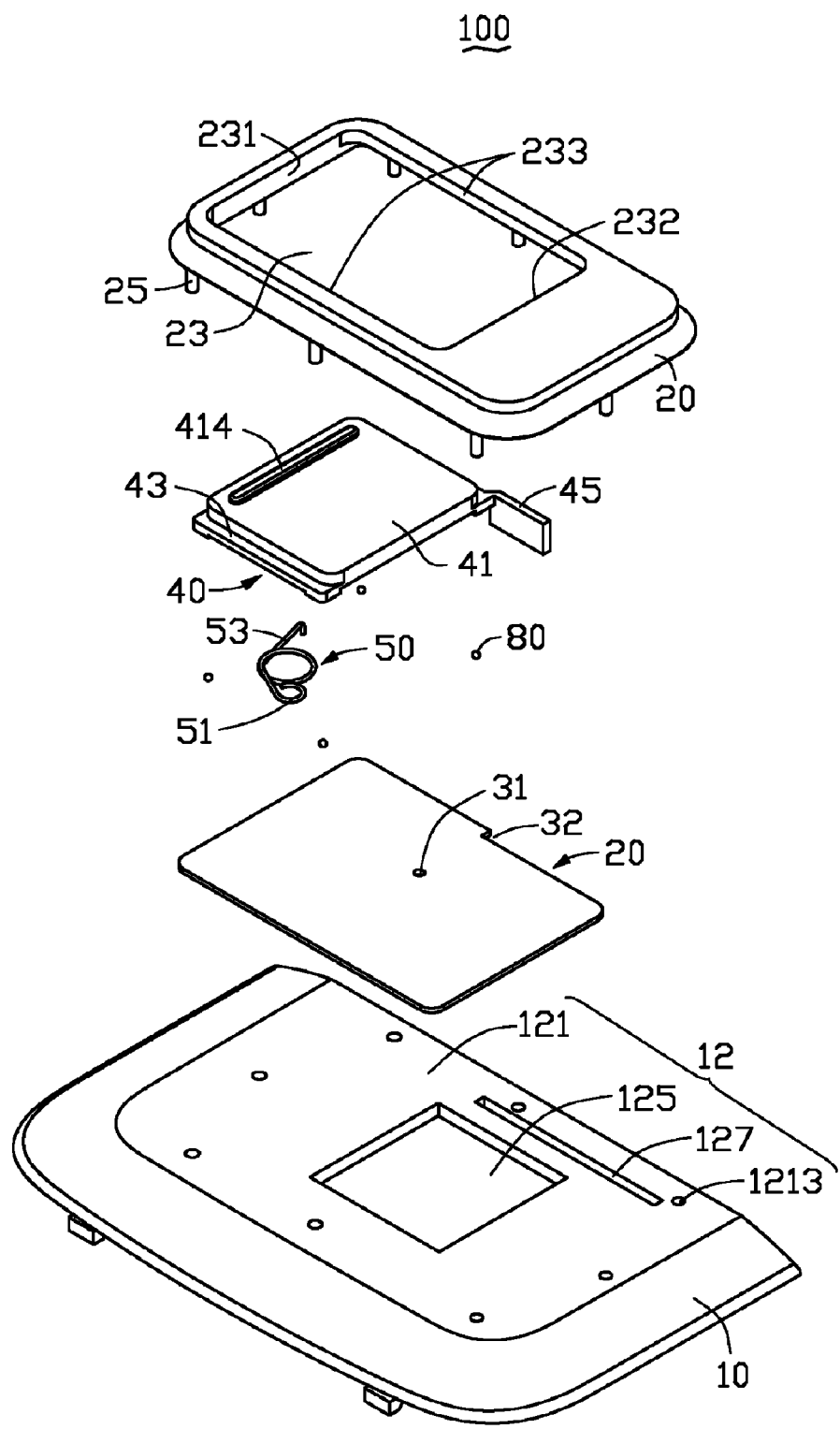
FIG. 1 is an exploded view of one exemplary embodiment of a lens cover used in a portable electronic device, the portable electronic device including a housing, a rear cover, a lens and a lens cover.
Figure 2:
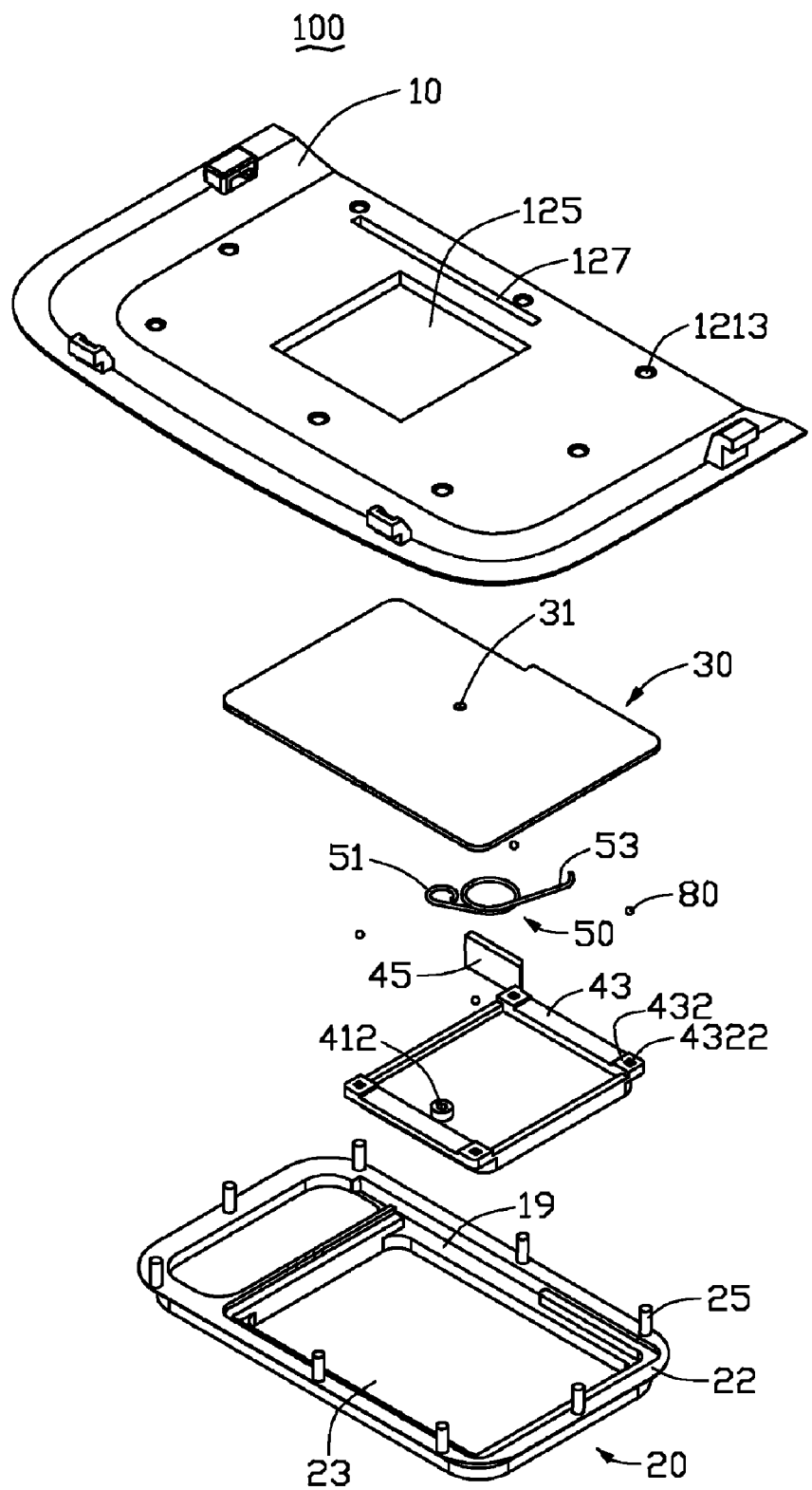
FIG. 2 is similar to the FIG. 1, but showing the portable electronic device in another aspect.

Referring to FIGS. 1 and 2, an exemplary embodiment of a lens cover 40 can be used on a portable electronic device 100, such as a cellular phone or any electronic device where a lens is desirable. The portable electronic device 100 includes a housing 10, a rear cover 20, a lens 30, a lens cover 40, a plurality of rolling balls 80 and an elastic element 50. The rear cover 20 is attached to the housing 10 to form an enclosure 60 (seen FIG. 3) for accommodating the lens 30 and the lens cover 40. The lens 30 is mounted to the housing 10 to protect digital camera (not shown) in the portable electronic device 100. The lens cover 40 is slidably mounted between the lens 30 and the rear cover 20 so that the lens cover 40 can cover or expose the digital camera selectively. The elastic element 50 connects the lens cover 40 to the lens 30 to provide an elastic force for driving the lens cover 40 slid. The rolling balls are mounted between the lens cover 40 and the lens to decrease friction force between the lens 30 and the lens cover 40.

The housing 10 includes a mounting portion 12. The mounting portion 12 includes a flat plate 121, a camera hole 125, a passage 127 and a plurality of retaining holes 1213. The passage 127 is longitudinally defined through the flat plate 121. The camera hole 125 are also defined through the flat plate 121 adjacent to the passage 127. The camera hole 125 may accommodate a camera (not shown) of the portable electronic device 100 therein. The retaining holes 1213 are defined in the flat plate 121 surrounding the camera hole 125 and the passage 127. The retaining holes 1213 are configured to mate with the rear cover 20.

The lens 30 may be made of glassy material or transparent plastic material. The lens 30 has a latching portion in the form of a trough 31 defined therethrough. The trough 31 is configured to latching one end of the elastic element 50 therein. The lens 30 further includes a notch 32 defined therethrough for mating with the lens cover 40.

The lens cover 40 includes a main body 41 substantially having the same shape as the camera hole 125 with a larger size than the camera hole 125. Each side of main body 41 has at least one guiding plates 43 protruding therefrom. The guiding plates 43 are slidably mounted to a guiding groove in the form of a slit 70 (seen FIG. 3) defined between the lens 30 and the rear cover 20, so that the main body 41 of lens cover 40 can slide relative to the lens 30 to cover or expose the camera hole 125. When the lens cover 40 is closed as shown in FIG. 4, the lens 30 aligned with the camera hole 125 is completely covered by the main body 41, so that it is possible to prevent a stain from sticking to the lens 30 where is aligned with the camera hole 125.

The lens cover 40 further includes a plurality of contacting portions 432, a trigger 45, a projection 412 and a finger grip portion 414. Each contacting portion 432 is a block protruding from a bottom surface of the guiding plates 43 facing the lens 30. Each contacting portion 432 has an installing hole 4322 defined therein. The installing holes 4322 have the same shape and size as the rolling balls 80 for rotatably accommodating the rolling balls 80. The function of rolling balls 80 in the contacting portions 432 is as follows: when the lens cover 40 is mounted on the lens 30, the lens 30 can contact with the rolling balls 80 in the contacting portions 432 to prevent the bottom surface of the lens cover 40 from directly contacting the lens 30, so as to decrease the frictional area between the lens 30 and the lens cover 40 and reduce the potential for scratching the lens from that of conventional designs. Additionally, when the lens cover 40 slides relative to the lens 30, the rolling balls 80 will be rolled. Thus, friction force between the lens 30 and the lens cover 40 is decreased so as to facilitate moving the lens cover 40 relative to the lens 30.

The trigger 45 in the form of a rectangular plate protrudes from a distal end of one guiding plate 43 on the lens cover 40. The trigger 45 is slidably accommodated in the passage 127 and partially inserted into the housing 10. When the lens cover 40 slides relative to the lens 30, the trigger 45 slides with the lens cover 40 to activate a switch (not shown) that turns on the digital camera(not shown). The projection 412 is a pole protruding from a surface of the main body 41 facing the lens 30. The projection 412 is configured to engage with the elastic element 50. The finger grip portion 414 is a rib transversely protruding from another surface of the main body 41 opposite to the projection 412. The finger grip portion 414 facilitates sliding the lens cover 40 relative to the lens 30.

The rear cover 20 includes a bottom panel 19 and a peripheral panel 22 protruding from an edge of the bottom panel 19. The rear cover 20 has a window 23 defined through the bottom panel 19. The window 23 corresponds to the camera hole 125 and is configured to accommodate the lens cover 40. The window 23 is defined by a first inner surface 231, a second inner surface 232 opposite the first inner surface 231, and two opposite third inner surfaces 233 connecting the first inner surface 231 with the second inner surface 232. A length between the first inner surface 231 and the second inner surface 232 meets the length of the sliding distance of the lens cover 40. A width between the third inner surfaces 233 meets the width of the main body 41 of the lens cover 40. Thus, the main body 41 can slide in the window 322 steadily. The rear cover 20 further has a plurality of retaining poles 25 protruding from a distal end portion of the peripheral panel 22. The retaining poles 25 are retained in the retaining holes 1213 to assemble the rear cover 20 to the housing 10.

The elastic element 50 is mounted between the lens cover 40 and the lens 30, to provide an elastic force for driving the lens cover 40 slid. In this exemplary embodiment, the elastic element 50 is a coil spring including a ring-shaped portion 51 formed one end thereof and a hook 53 formed another end thereof. The elastic element 50 is mounted to the lens cover 40 in such a manner that the ring-shaped portion 51 of the elastic element 50 is inserted into the projection 412 of the lens cover 40. The elastic element 50 is mounted to the lens 30 in such a manner that the hook 53 of the elastic element 50 is inserted to the trough 31 of the lens 30.

Figure 3:
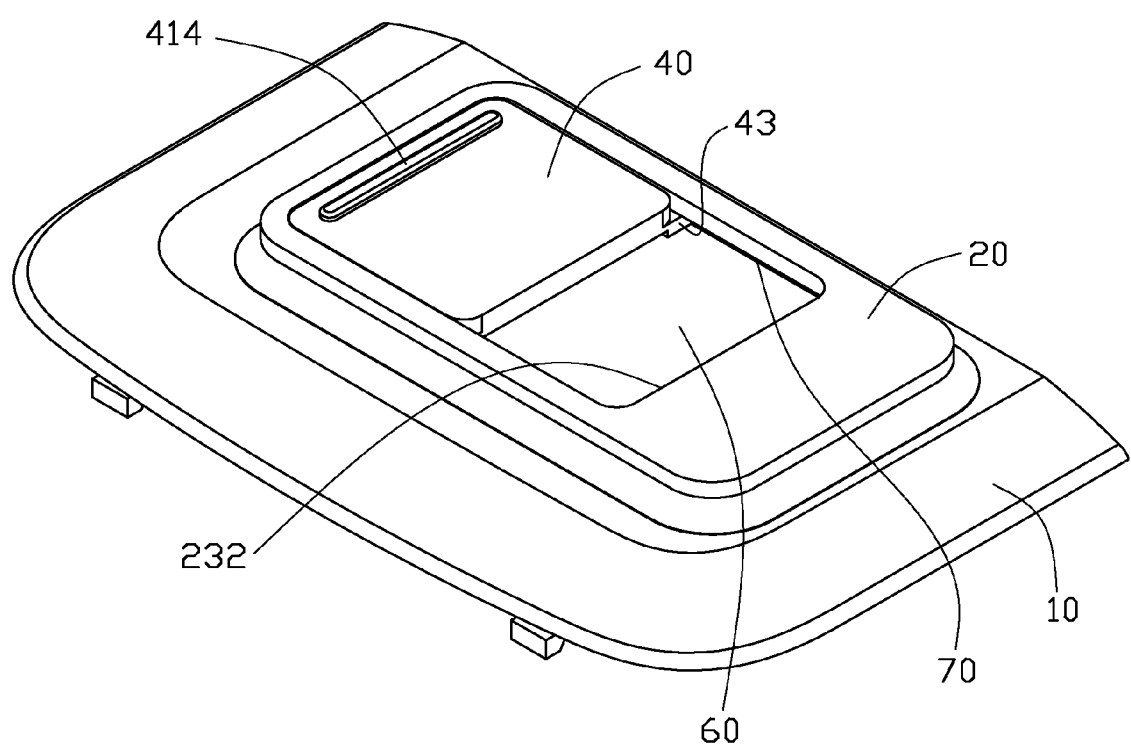
FIG. 3 is a partially enlarged and assembled view of the portable electronic device in an opened state.
Figure 4:
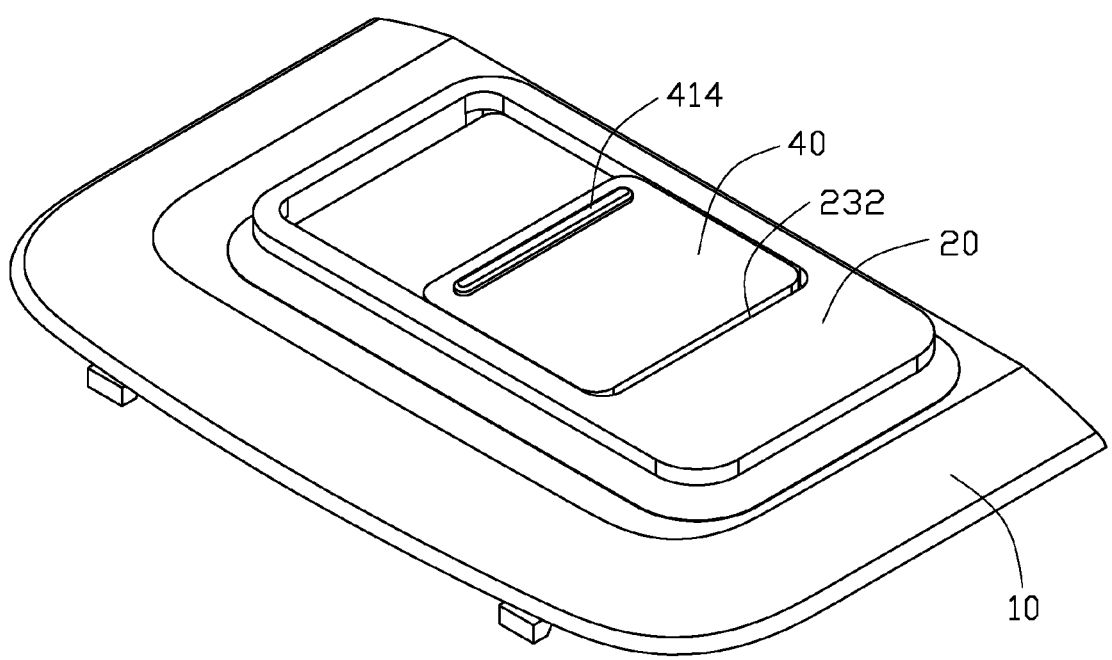
FIG. 4 is similar to the FIG. 3, but the lens cover is in a closed state.

Referring to FIGS. 1 to 3, during assembling the portable electronic device 100, firstly, the lens 30 is attached to the flat plate 121 to cover the camera hole 125. Secondly, the ring-shaped portion 51 of the elastic element 50 is wound to the projection 412 of the lens cover 40, so that one end of the elastic element 50 is mounted to the lens cover 40. Then, the trigger 45 of the lens cover 40 is accommodated in the passage 127 through the flat plate 121, the hook 53 of the elastic element 50 is inserted to the trough 31 of the lens 30, so as to mount the lens cover 40 on the lens 30. At this time, the rolling balls 80 are mounted on the lens 30 to support the lens cover 40 to the lens 30, and the lens cover 40 covers the camera hole 125 of the housing 10. After that, the retaining poles 25 of the rear cover 20 are secured into the retaining holes 1213 of the housing 10 so that the rear cover 20 is assembled to the housing 10. At this time, the guiding plates 43 of the lens cover 40 are slidably mounted to the slit 70 defined between the lens 30 and the rear cover 20, and the first inner surface 231 of the window 23 slightly biases the lens cover 40 so the elastic element 50 is slightly distorted to accumulate rebounding elastic force. Thereby, the lens cover 40 is firmly accommodated in the window 23.

Referring to FIG. 4, in use, the finger grip portion 414 is pushed toward the second inner surface 232 of the window 23, to drive the guiding plate 43 of the lens cover 40 moved on the lens 30 toward the second inner surface 232, and the rolling balls are rolled to decrease friction force between the guiding plate 43 and the lens 30. At this time, the ring-shaped portion 51 of the elastic element 50 also moves toward the second inner surface 232 so that the elastic element 50 is distorted to accumulate elastic force. When the ring-shaped portion 51 is aligned with the hook 53, the elastic element 50 is mostly distorted to accumulate maximum of the elastic force, i.e., the lens cover 40 is in an intermediate state. The finger grip portion 414 is continuously push toward the second inner surface 232 until the ring-shaped portion 51 is over the intermediate state, the elastic element 50 will expand under previously accumulated elastic force, which drives the lens cover 40 continuously moving to the second inner surface 232. At this stage, the trigger 45 activates a switch (not shown) that turns on the digital camera (not shown), and the camera hole 125 is exposed, so the portable electronic device 100 is ready to take a photo.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens cover slidably mounted to a lens, the lens cover comprising:
a main body; and
two guiding plates, the two guiding plates respectively protruding outwardly from two opposite sides of the main body;
wherein each guiding plate has a plurality of contacting portions protruding from an surface thereof facing the lens, each contacting portion includes a rolling ball mounted thereon.

2. The lens cover of claim 1, wherein the contacting portions are blocks protruding from the guiding plates.

3. The lens cover of claim 1, wherein each contacting portion has an installing hole defined therein, the rolling balls are rotatabaly accommodated in the installing holes.

4. The lens cover of claim 1, wherein the rolling balls support the lens cover on the lens to prevent the surface of the lens cover facing the lens from directly contacting the lens.

5. The lens cover of claim 1, wherein the lens cover further includes a finger grip portion transversely protruding from another surface opposite the sliders.

6. A portable electronic device comprising:
a housing;
a rear cover, the rear cover mounted to the housing;
a lens, the lens mounted to the housing; and
a lens cover, the lens cover slidably mounted to the lens, the lens cover comprising:
a main body; and
two guiding plates, the two guiding plates respectively protruding outwardly from two opposite sides of the main body;
wherein each guiding plate has a plurality of contacting portions protruding from an surface thereof facing the lens, each contacting portion includes a rolling ball mounted thereon.

7. The portable electronic device of claim 6, wherein the contacting portions are blocks protruding from the guiding plates.

8. The portable electronic device of claim 6, wherein each contacting portion has an installing hole defined therein, the rolling balls are rotatabaly accommodated in the installing holes.

9. The portable electronic device of claim 6, wherein the rolling balls support the lens cover on the lens to prevent the surface of the lens cover facing the lens from directly contacting the lens.

10. The portable electronic device of claim 6, wherein the lens cover further includes a finger grip portion transversely protruding from another surface opposite the sliders.

11. The portable electronic device of claim 6, wherein the housing has a mounting portion formed thereon, the mounting portion includes a flat plate and a camera hole, the camera hole is defined through the flat plate, the lens is attached to the flat plate to cover the camera wall.

12. The portable electronic device of claim 11, wherein the flat plate has plurality of retaining holes defined therein, the rear cover has a plurality of retaining poles protruding therefrom, the retaining poles are retained in the retaining holes to mount the rear cover to the housing.

13. The portable electronic device of claim 11, wherein the rear cover has a window defined therein corresponding to the camera hole of the housing, the main body of the lens cover is slidably accommodated in the window.

14. The portable electronic device of claim 13, wherein the window is defined by a first inner surface, a second inner surface opposite the first inner surface, and two opposite third inner surfaces connecting the first inner surface with the second inner surface, a length between the first inner surface and the second inner surface meets the length of the sliding area of the lens cover, a width between the third inner surfaces meets the width of the main body of the lens cover.

15. The portable electronic device of claim 6, wherein a guiding groove is defined between the rear cover and the housing, the guiding plates are accommodated in the guiding groove.

16. The portable electronic device of claim 6, wherein the portable electronic device further include an elastic element, the elastic element is mounted between the lens and the lens cover to provide an elastic force for sliding the lens cover relative to the lens.

17. The portable electronic device of claim 16, wherein the elastic element is a coil.

18. The portable electronic device of claim 17, wherein one end of the coil has a ring-shaped portion formed thereon, the lens cover has a projection protruding from the main body, the ring-shaped is wound on the projection.

19. The portable electronic device of claim 18, wherein another end of the coil has a hook formed thereon, the lens has a latching portion defined therein, the hook is latching in the latching portion.

20. The portable electronic device of claim 19, wherein the latching portion is a trough defined in the lens.

* * * * *